United States Patent [19]

Piper

[11] Patent Number: 4,812,017
[45] Date of Patent: Mar. 14, 1989

[54] PIXEL CONFIGURATION TO ACHIEVE A STAGGERED COLOR TRIAD WITH INSULATED CONNECTION BETWEEN THIRD, SPLIT PIXEL ELECTRODES

[75] Inventor: William W. Piper, Scotia, N.Y.
[73] Assignee: General Electric Company, Schenectady, N.Y.
[21] Appl. No.: 138,167
[22] Filed: Dec. 28, 1987
[51] Int. Cl.$^4$ ............................................... G02F 1/13
[52] U.S. Cl. ..................................... 350/333; 350/336; 350/339 F
[58] Field of Search ..................... 350/333, 336, 339 F

[56] References Cited

U.S. PATENT DOCUMENTS 4,600,274  7/1986  Morozumi ........................ 350/339 F

OTHER PUBLICATIONS

Tsuruta, S. et al., "Color Pixel Arrangement Evaluation for LC-TV", *Conference Record of the 1985 International Display Research Conference*, 85CH2239-2, pp. 24-26.
Saito, T., "A High Picture Quality LC-TV Using Tri-angle Trio-Color Dots Addressed by a-Si TFTs", *Conference Record of the 1985 International Display Research Conference*, 85CH2239-2, pp. 27-29.

*Primary Examiner*—John S. Heyman
*Assistant Examiner*—Richard F. Gallivan
*Attorney, Agent, or Firm*—Geoffrey H. Krauss; James C. Davis, Jr.; Marvin Snyder

[57] ABSTRACT

A pixel electrode arrangement for use in color liquid crystal display devices provides that on every other row the color filter pixels and their associated transparent electrodes are split symmetrically by the data drive line. Data voltages are supplied to the split electrode pair either by two FETs or by an appropriately insulated conductive bridge extending between split electrode pads. The configuration provided exhibits the advantages inherent in a staggered triad color arrangement without the penalty of decreased data bus pitch or of increased bus overlap. Furthermore, the fraction of the total display area utilized by transmitted light is maintained at a high fraction of the total display area.

6 Claims, 2 Drawing Sheets

PIXEL CONFIGURATION TO ACHIEVE A STAGGERED COLOR TRIAD WITH INSULATED CONNECTION BETWEEN THIRD, SPLIT PIXEL ELECTRODES

BACKGROUND OF THE INVENTION

The present invention is generally directed to color pixel configurations of a single picture element which are useful in color liquid crystal display (LCD) devices to improve visual perception. More particularly, the present invention is directed to a color pixel configuration which consumes a minimal amount of display area for electrical drive lines and the like, while still providing optimal visual clarity.

In liquid crystal display devices of the matrix addressed variety, liquid crystal material is disposed between panels which are typically glass and in which at least one of the panels and its associated circuitry is transparent. Transparency is achieved by the utilization of metallization connections using materials such as indium tin oxide (ITO). One of the panels typically possesses an array of pixel electrodes, each of which is associated with a switching device which operates to supply an electrical voltage to the pixel electrode. The switching devices preferably comprise thin film amorphous silicon field effect transistors (FETs). The opposing panel possesses a ground plane electrode so that in effect, a capacitor-like structure is established with liquid crystal material being disposed between a "ground plane", or "back plane", electrode and an array of individually controllable pixel electrodes. By switching the associated semiconductor devices, voltages are applied to the pixel electrodes so as to change the orientation and optical properties of liquid crystal material disposed between individual pixel electrodes and the ground plane electrode. In this way, images are constructed on the flat panel device as a configuration of pixel elements. It is noted that variable-magnitude voltage signals by variable magnitude applied to select pixel electrodes can achieve gray scale effects. Signal values large enough to drive the liquid crystal material fully on or off are also employable, particularly in situations in which only character or textual information is to be displayed.

Liquid crystal display devices of the matrix-addressed kind typically include a set of source (or data) lines and a set of gate lines arranged in a rectangular grid fashion so that by application of appropriate electrical signals on the source lines and gate lines, individual pixel electrodes may be controlled so as to produce the desired optical effect, namely the display of part of an image on the screen. Taken in toto, the pixel elements portray the desired image. Thus, flat panel liquid crystal display devices function to produce the same effects as conventional CRTs (cathode ray tubes).

It is noted that some LCDs operate on reflected light. In such cases, the light is typically reflected from an opaque back panel. However, it is also noted that both panels and their associated pixel electrodes may be made transparent so as to supply the desired optical effect by means of back lighting which is usually contained in the same physical package as the liquid crystal display itself.

It is also possible to achieve color effects in liquid crystal display devices. These color effects are achieved through the utilization of color filters arranged in registration with the pixel electrode pattern. In the past, several red/green/blue triad cluster patterns (associated with the same picture element) have been proposed for this purpose. For example, an article by S. Tsuruta et al. has indicated that improved picture quality is obtained when color pixels are arranged so the third color is positioned symmetrically above or below the other two colors. A related article by T. Saito et al. describes a matrix layout to achieve this configuration in LCD devices. In this configuration, each color pixel is divided vertically in half and a second set of vertically extending data buses is incorporated. With a transistor to address each half pixel, a staggered triad arrangement can be realized. However, a significant disadvantage of this arrangement is that the pitch of the data buses is reduced by a factor of 2 so that, for the same resolution, the photolithography is more critical and the stray capacitance effects require that a smaller fraction of the total available screen area can be used for light transmission.

A second approach that could be undertaken would be to stagger whole pixel elements on alternate lines. However, this would require the data lines to snake back and forth with half pixel jogs over half pixel dimensions. This snaking would be required for each row in the display and would result in a much larger crossover area between gate buses and data buses. This is undesirable since it increases the potential for short circuiting between gate lines and data lines in the display. Such requirements would make fabrication more difficult. Most importantly, however, such a configuration would significantly reduce the process yield, a significant economic concern. Also, short circuits between gate lines and data lines would scale linearly with crossover area. Thus, the larger the display, the greater is the possibility for circuit defects resulting in poor and/or unusable display screens.

SUMMARY OF THE INVENTION

In accordance with a preferred embodiment of the present invention, a pixel arrangement for color liquid crystal displays comprises a plurality of row pairs, in each pair of which, there is a first, or upper, row of normal size pixel elements which exhibit a repeated pattern of a predetermined sequence of colors. A typical sequence would, for example, be RGBRGBRGB . . ., where R, G and B stand for the colors red, green and blue, respectively. Immediately beneath this row of normal size pixel elements, there is disposed a second row of substantially half size pixel elements, in each of which, the same sequence of color filter patterns is present, but shifted by an amount equal to approximately 1½ pixel widths. Thus, each pixel element in the first row is associated with two half size pixel elements in the second row immediately below it. By utilizing this shifted sequence, each such set of three pixel elements exhibits the desired triad color configuration. Furthermore, the arrangement of color pixel elements as described herein does not require modification of the bus matrix. The only alteration that is required is the utilization of an extra switch device or an appropriately insulated conductive bridge. The configuration described has the advantages of providing the desired staggered triad without paying the penalty a factor of 2 decrease in data bus pitch, or of increased bus overlap area. The fraction of total display area utilized by the optical components is larger than the fractional area required by the displays exhibiting a double density of data bus lines. It should also be noted that, as used herein and in the appended claims, the term "pixel element" generally refers to the combination of a pixel electrode and its associated color filter.

Accordingly, it is an object of the present invention to provide a color pixel element arrangement for liquid crystal display devices.

It is also an object of the present invention to provide a liquid crystal display screen in which color images are arranged in triads in which a third color is positioned symmetrically above or below the other two colors.

It is yet another object of the present invention to permit the construction of larger color liquid crystal displays without concomitantly increasing capacitive loads arising from snaking data lines through a large plurality of half pixel width jogs.

It is a still further object of the present invention to provide liquid crystal display configurations which are easily manufacturable and which do not significantly affect fabrication yields.

It is still another object of the present invention to provide a liquid crystal display screen in which as large an area as possible is devoted to optical features such as the transparent pixel electrodes, as compared to less transparent portions of the screen such as the source and data line drivers and the semiconductor switching elements themselves.

It is also an object of the present invention to provide an arrangement of color filters for pixel electrodes for use in liquid crystal display devices.

It is a still further object of the present invention to provide pixel configurations which do not require modifications of the conventional rectangular grid arrangement of source and data drive lines.

It is yet another object of the present invention to provide pixel configurations which do not require increase lengths of either the source or data drive lines or which require the construction of screen regions in which these lines extend parallel to one another for any significant distance.

Lastly, but not limited hereto, it is an object of the present invention to reduce shorts between gate lines and data lines and to minimize stray capacitance effects occurring in such devices.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
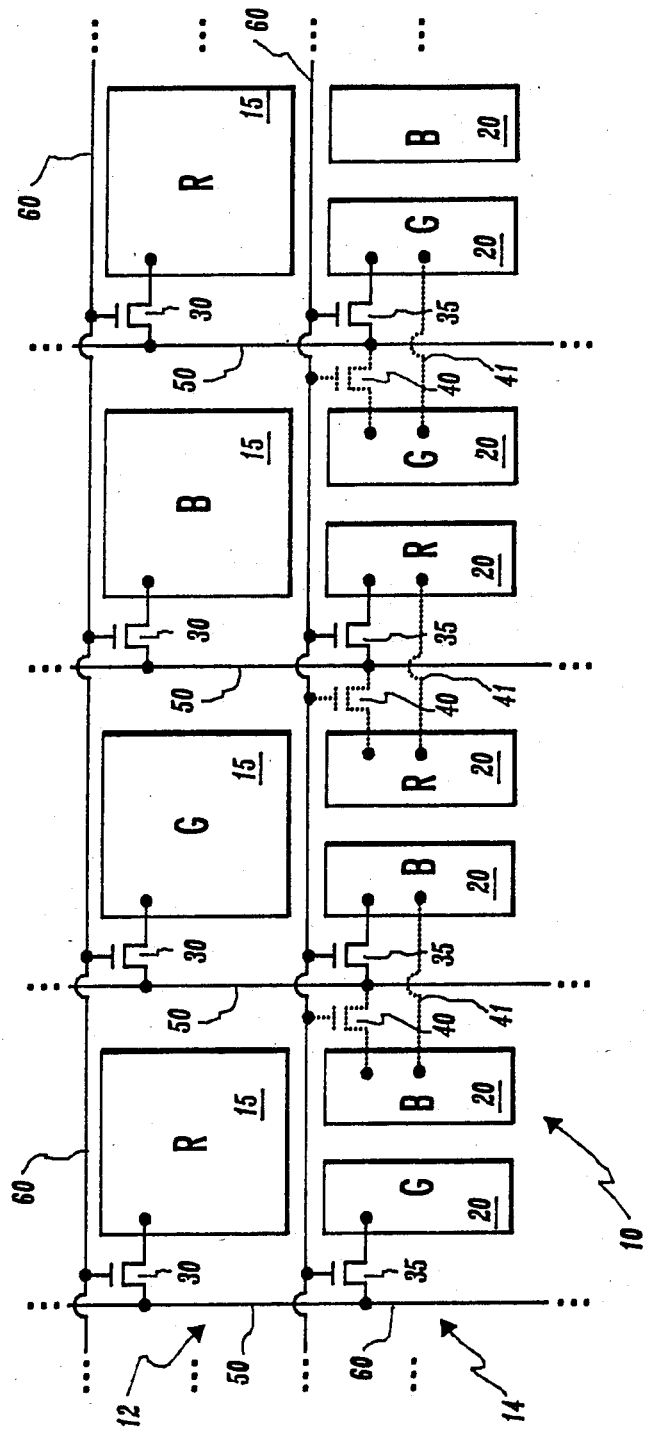
FIG. 1 is a schematic diagram of a portion of a matrix-addressed liquid crystal display screen illustrating the desired pixel electrode and color filter arrangement in the present invention.

FIG. 1 illustrates, in schematic form, a portion of a pair of rows of pixel elements in accordance with the present invention. In particular, first or upper row 12 is seen to include regular size pixel electrodes 15 which are associated with color filters in the sequence ... RGBR ..., as indicated, where the letters stand for the colors red, green and blue respectively. It should be understood that the illustration in FIG. 1 is schematic in nature and that the pixel electrodes themselves are not themselves colored, but rather the color component is provided by means of a patterned configuration of filters arranged in optical registration with pixel electrodes 15 and 20. Typically, color optical filter elements are disposed on the transparent (usually glass) panel containing the ground plane electrode, which typically comprises indium tin oxide which is disposed over the filter elements which are aligned with opposing pixel electrodes on the other (glass) panel.

Below each pixel element 15 there is provided a pair of pixel electrodes 20 which are approximately half the size of the associated pixel element in the first row. It is also seen that the sequence of colors is the same in the second row as in the first; however, it is noted that the color pattern associated with filter elements for the second row 14 is shifted by approximately 1½ pixel widths. This shift provides the desired color triad arrangement. Each color is seen to be present to the same degree, particularly as measured over large screen areas. As pointed out above, it should be borne in mind that the letters R, G and B in FIGS. 1 and 2 refer to the color filter which is associated with corresponding pixel electrodes 15 or 20. It should also be noted that the separation between half pixels of different color can be made vanishingly small with sufficiently sophisticated processing techniques.

One of the significant advantages of the color pixel configuration of the present invention is the continued ability to utilize rectangularly laid out source and gate drive lines 50 and 60, respectively. These drive lines are preferably arranged in a rectangular grid, substantially as shown. Furthermore, it is noted that it is generally desirable that for the purpose of displaying normal images, the grid of source and gate drive lines define substantially square regions into which the pixel electrodes are disposed. As contemplated in preferred embodiments of the present invention, the liquid crystal display is fabricated using amorphous silicon thin film transistors 30, 35 and (optionally) 40, connected as shown. Furthermore, during fabrication, it is noted that source and gate drive lines are typically deposited using VLSI photolithography techniques and are in fact deposited in separate layers which are insulated from one another so as to provide the desired degree of electrical isolation, particularly at points of intersection.

More particularly, FIG. 1 illustrates the fact that source drive line 50 passes between smaller pixel electrodes 20 so that the same color filter is employed on both sides of source line 50 in second row 14. Each pixel electrode 15 in first row 12 is associated with its own semiconductor switch device 30 which permits voltages appearing on source line 50 to be applied to pixel electrode 15 when the associated gate drive line 60 for that row is activated.

In a similar fashion, pixel electrodes 20 in second row 14 are connected to semiconductor switch elements 35 as shown. However, some mechanism must be provided for energizing the other pixel electrode disposed on the opposite side of source drive line 50 and associated with the same color filter. In particular, in the present invention, two mechanisms are provided for this purpose.

Most simply, an insulated electrical connection 41 may be established between correspondingly colored pixel elements on the opposite side of source drive line 40 in row 14. Alternatively, a second semiconductor switch device 40 may be provided to achieve this same function. For reasons of simplicity, insulated electrical connection 41 is preferred. It is in particular noted that electrical connection 41 and semiconductor switch 40 are shown as dotted lines in FIG. 1 to indicate that they are optional. However, at least one such mechanism must be provided to achieve the energization of the other half of the pixel electrodes in row 14.

Figure 2:
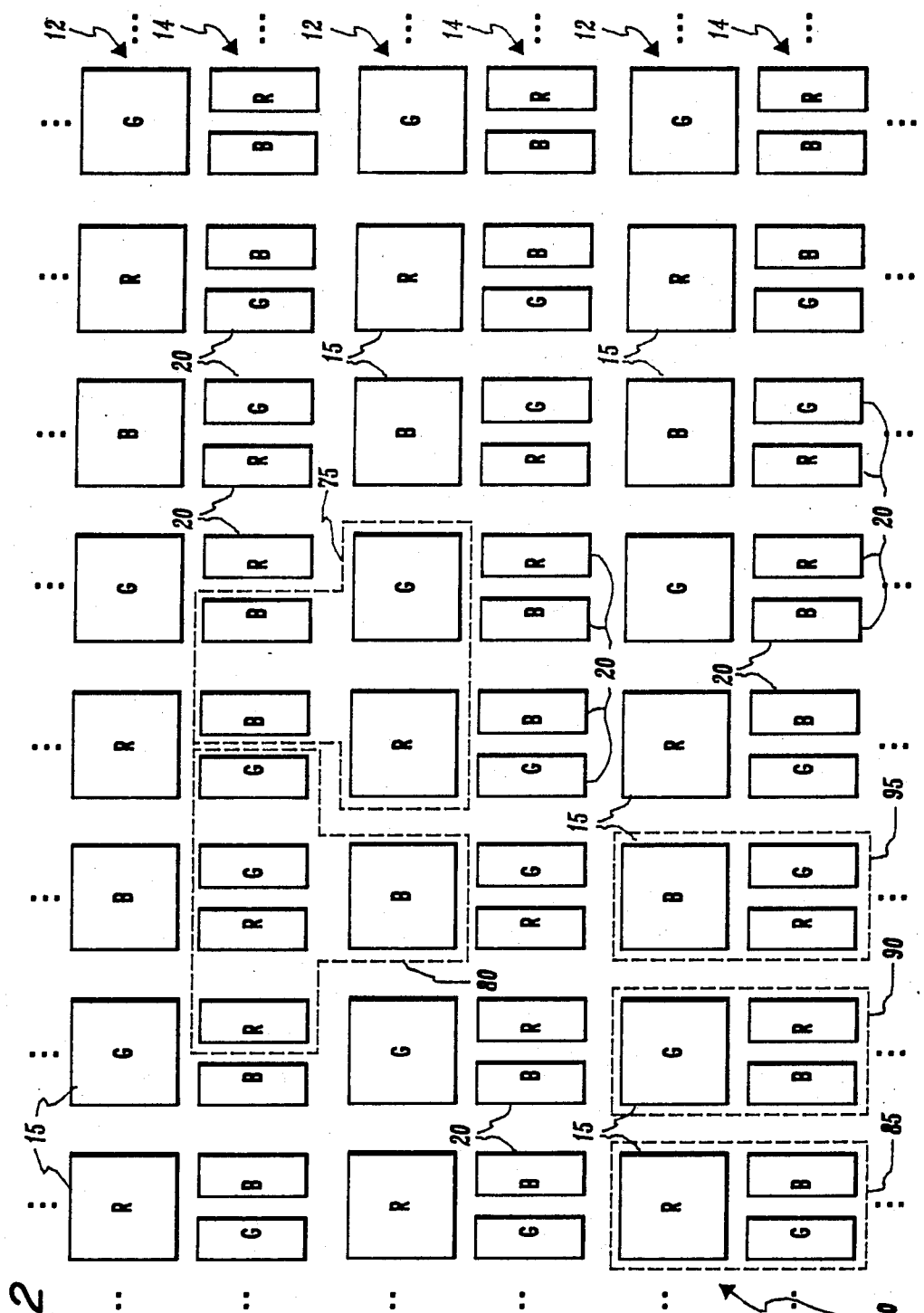
FIG. 2 is a view similar to FIG. 1 but more particularly illustrative of utilization of a plurality of row pairs from FIG. 1 and also more particularly illustrating other advantageous symmetries with respect to the subject pixel configuration.

FIG. 2 is provided to illustrate several different symmetries which exist in the structure of the present invention. FIG. 2 also illustrates the utilization of a plurality 70 of pairs of rows 12 and 14 of pixel elements to form a desired screen configuration. From one perspective, a group of five color filter elements such as indicated by grouping 80 in FIG. 2, may be considered to represent a single color triad. It is seen that such triads and their color variations may be used in regular and inverted positions to tesselate or tile the entire plane of the screen. On another level, groups of three such as represented by groupings 85, 90 or 95, may be considered as also being able to tile the plane. However, in both instances, it is not just the ability of these groupings to tile the plane that is important, but rather it is also important that each color is represented in each grouping so that when grouped together, a color filter arrangement results in which each color in the triad appears symmetrically disposed with respect to the other color pixel elements in a triad grouping as suggested by groupings 75 and 80. It should also be borne in mind that FIGS. 1 and 2 are representative of a particular red, green and blue color sequence. However, permutations of the same sequence are equally employable in the present invention. It should further be noted that while the invention has been described in terms of horizontal rows and vertical columns and with vertically extending source and horizontally extending gate drive lines, it is possible to reverse the directionality of these designations as long as one maintains a consistency and connects the pixel electrodes appropriately.

It should be particularly noted that the desired degree of symmetry is present in the arrangement shown in both FIGS. 1 and 2. It should also be appreciated that source and gate drive lines 50 and 60 extend in substantially straight lines between the various pixel elements. No "snaking" of these drive lines is required; they are laid out in straight lines. This virtually eliminates any increased capacitive effects between these lines. It should also be especially appreciated that the configuration of the present invention does not involve any penalty associated with the factor of 2 decrease in data bus pitch or increased bus overlap associated with other configurations. The fraction of the total display area utilized by usefully transmitted light is thereby improved in the present configuration. In the present invention on every other row, the color filter pixels and their associated transparent electrodes are split symmetrically by the source or data drive line bus. Data voltages are supplied to the electrode pads by a pair of FET switches or by an appropriately insulated conductive bridge and a single switch. Multiple symmetries are provided. While conventional display desires dictate that pixel electrodes 20 are approximately half the size of electrodes 15 (in area), it is not necessary to stay within this ratio to maintain the spirit of the present invention. Likewise, perfectly square coordinate source and gate line grids are not strictly required, although they are certainly desired for providing substantially undistorted view on the display.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An arrangement of pixel electrodes for two adjacent rows in a color panel display, said arrangement comprising:
   a first row of pixel electrodes, said pixel electrodes being associated with adjacently disposed color filters which exhibit a repeated pattern of a predetermined sequence of three colors;
   a second row of pixel electrodes disposed adjacent to said first row, said second row possessing twice as many pixel electrodes, with each such electrode having approximately half the width of the adjacent pixel electrode in said first row, said pixel electrodes in said second row being disposed in pairs with each pair being adjacent to and substantially aligned with a pixel electrode in said first row, said pixel electrodes in said second row being associated with adjacently disposed color filters exhibiting, in pairs, the same predetermined sequence of colors as in said first row, said sequence of color filters in said second row being shifted so that three distinct color filters are present for each set of pixel electrodes which set includes a pixel electrode from the first row and the two substantially aligned adjacent pixel electrodes from said second row; and
   means for simultaneously driving pixel electrodes of said second row which are horizontally adjacent and which are associated with the same color filter, and including an insulated electrical conductor extending between said horizontally adjacent pixels.

2. An arrangement of pixel electrodes for a color panel display, said arrangement comprising a plurality of row pairs from claim 1, said row pairs being disposed adjacent to and aligned with one another.

3. The arrangement of claim 1 in which said drive means comprises a pair of semiconductor switch devices.

4. The arrangement of claim 1 further including source lines extending vertically between said pixel electrodes in said first row and between pixel electrodes in said second row so that pixel electrodes which are associated with the same color filter in said second row lie on opposite sides of said source drive lines.

5. The arrangement of claim 4 further including gate drive lines extending horizontally between said pixel elements, said gate drive line being insulated from said source drive lines.

6. The arrangement of claim 1 wherein said drive means further includes at least one semiconductor switch device.

* * * * *